(12) United States Patent
Challa et al.

(10) Patent No.: US 10,176,019 B2
(45) Date of Patent: *Jan. 8, 2019

(54) DYNAMIC MANAGEMENT OF COMPUTING PLATFORM RESOURCES

(71) Applicant: International Business Machines Corporation, Armonk, NY (US)

(72) Inventors: Narsimha R. Challa, Hyderabad (IN); Adam T. Stallman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 392 days.

This patent is subject to a terminal disclaimer.

(21) Appl. No.: 14/662,862

(22) Filed: Mar. 19, 2015

(65) Prior Publication Data

US 2016/0277310 A1  Sep. 22, 2016

(51) Int. Cl.
*G06F 9/50* (2006.01)
*H04L 29/08* (2006.01)

(52) U.S. Cl.
CPC .......... *G06F 9/5077* (2013.01); *H04L 67/10* (2013.01); *G06F 2209/503* (2013.01)

(58) Field of Classification Search
CPC ................ G06F 9/00–9/5077; G06F 2209/50–2209/503; H04L 65/00–65/80; H04L 67/10–67/1027
See application file for complete search history.

(56) References Cited

U.S. PATENT DOCUMENTS

| 7,814,495 B1 | 10/2010 | Lim et al. |
| 8,874,749 B1 | 10/2014 | Vittal et al. |
| 2006/0090197 A1 | 4/2006 | Hermann et al. |

(Continued)

FOREIGN PATENT DOCUMENTS

WO  2011067029 A1  6/2011

OTHER PUBLICATIONS

Williams, Clayton R., (Examiner), U.S. Patent and Trademark Office, Office Action issued in related U.S. Appl. No. 14/662,799 dated Apr. 6, 2017.

(Continued)

*Primary Examiner* — Clayton R Williams
(74) *Attorney, Agent, or Firm* — Middleton Reutlinger

(57) ABSTRACT

Embodiments of the invention provide for systems and computer program products for management of logically partitioned computing resources of a data processing system configured with hypervisors that each manages one or more logical partitions of the computing resources. The data processing system is configured with domains, and allocated to each domain are one or more hypervisors and logical partitions managed thereby. For a first domain, a token is received from a second domain. The token identifies available computing resources of the second domain that are available for temporary allocation. The data processing system determines whether the available computing resources of the second domain are needed by the first domain based at least in part on the received token. Responsive to determining that the available computing resources are needed by the first domain, the available computing resources are temporarily allocated to the first domain for use thereby.

8 Claims, 14 Drawing Sheets

(56) References Cited

U.S. PATENT DOCUMENTS

| | | | |
|---|---|---|---|
| 2008/0282256 | A1 | 11/2008 | Misra |
| 2009/0089790 | A1* | 4/2009 | Manczak .................. G06F 9/52 718/104 |
| 2009/0138877 | A1 | 5/2009 | Fitzgerald et al. |
| 2010/0251238 | A1 | 9/2010 | Schuba et al. |
| 2010/0325454 | A1 | 12/2010 | Parthasarathy |
| 2011/0090911 | A1 | 4/2011 | Hao et al. |
| 2011/0137805 | A1 | 6/2011 | Brookbanks et al. |
| 2011/0145392 | A1* | 6/2011 | Dawson ................ G06F 9/5072 709/224 |
| 2012/0030673 | A1 | 2/2012 | Sakamoto |
| 2012/0054280 | A1 | 3/2012 | Shah |
| 2012/0116782 | A1 | 3/2012 | Punnoose et al. |
| 2012/0173730 | A1 | 7/2012 | Krumpe, Jr. |
| 2012/0246641 | A1* | 9/2012 | Gehrmann .............. G06F 9/445 718/1 |
| 2012/0284709 | A1* | 11/2012 | Lorenc ................ G06F 9/45558 718/1 |
| 2013/0173900 | A1 | 7/2013 | Liu |
| 2013/0262682 | A1* | 10/2013 | Olsen .................. H04L 67/1031 709/226 |
| 2013/0263208 | A1 | 10/2013 | Challa |
| 2013/0268643 | A1 | 10/2013 | Chang et al. |
| 2013/0339949 | A1 | 12/2013 | Spiers et al. |
| 2014/0012995 | A1* | 1/2014 | Zhang .................. H04L 47/785 709/226 |
| 2014/0040474 | A1 | 2/2014 | Blagodurov et al. |
| 2014/0075568 | A1 | 3/2014 | Sathyadevan et al. |
| 2014/0137104 | A1* | 5/2014 | Nelson ................ G06F 9/45558 718/1 |
| 2014/0215172 | A1 | 7/2014 | Tsirkin |
| 2014/0280701 | A1* | 9/2014 | Wolcott ................ H04L 69/324 709/217 |
| 2014/0330948 | A1 | 11/2014 | Dunn et al. |
| 2015/0304243 | A1 | 10/2015 | Jasperson, Jr. et al. |
| 2016/0259750 | A1 | 9/2016 | Keidar et al. |

OTHER PUBLICATIONS

Williams, Clayton R., (Examiner), U.S. Patent and Trademark Office, Office Action issued in related U.S. Appl. No. 14/839,411 dated Apr. 6, 2017.

"Temporal isolation among virtual machines", Source: http://en.wikipedia.org/w/index.php?oldid=532435769 Contributors: A.wasylewski, Chowbok, Chris the speller, Cucinotta, Dubious Irony, Ettrig, Hadeswing, Nick Number, R'n'B, 2 anonymous edits, Jan. 2013.

Himanshu Raj et al., "Resource Management for Isolation Enhanced Cloud Services," CCSW '09; Nov. 13, 2009; pp. 77-84.

"Oracle VM Server for SPARC 2.0 Administration Guide," Oracle Corporation, Part No. 821-1485-10, Sep. 2010.

Cloud Security Alliance, Inc.; "Security Guidance for Critical Areas of Focus in Cloud Computing V3.0," http://www.cloudsecurityalliance.org/guidance/csaguide.v3.0.pdf; 2011.

Linqiang Ge et al., "On Localization Attacks Against Cloud Infrastructure," Proceedings of the SPIE, vol. 8757, 875703-1, 9 pages, 2013.

Igor V. Ternovskiy et al., "Cyber Sensing 2013," Proceedings of the SPIE, vol. 8758, 875701-1, Apr. 30-May 1, 2013.

Vang, Meng, (Examiner), U.S. Patent and Trademark Office, Office Action issued in related U.S. Appl. No. 14/662,716 dated Jun. 26, 2017.

Vang, Meng, (Examiner), U.S. Patent and Trademark Office, Office Action issued in related U.S. Appl. No. 14/839,502 dated Jun. 26, 2017.

Williams, Clayton R., (Examiner), U.S. Patent and Trademark Office, Office Action issued in related U.S. Appl. No. 14/839,318 dated Jul. 14, 2017.

U.S. Patent and Trademark Office, Final Office Action issued in related U.S. Appl. No. 14/839,502 dated Dec. 28, 2017.

U.S. Patent and Trademark Office, Final Office Action issued in related U.S. Appl. No. 14/662,716 dated Jan. 3, 2018.

U.S. Patent and Trademark Office, Office Action issued in related U.S. Appl. No. 14/662,799 dated Oct. 19, 2017.

U.S. Patent and Trademark Office, Office Action issued in related U.S. Appl. No. 14/839,411 dated Oct. 19, 2017.

U.S. Patent and Trademark Office, Notice of Allowance issued in related U.S. Appl. No. 14/839,318 dated Nov. 16, 2017.

U.S. Patent and Trademark Office, Office Action issued in related U.S. Appl. No. 14/839,318 dated Jan. 11, 2018.

U.S. Patent and Trademark Office, Office Action issued in related U.S. Appl. No. 14/662,799 dated Jun. 4, 2018.

U.S. Patent and Trademark Office, Office Action issued in U.S. Appl. No. 14/839,411 dated Jun. 4, 2018.

U.S. Patent and Trademark Office, Non-Final Office Action issued in related U.S. Appl. No. 14/662,716 dated Jul. 2, 2018.

U.S. Patent and Trademark Office, Non-Final Office Action issued in related U.S. Appl. No. 14/839,502 dated Jul. 2, 2018.

U.S. Patent and Trademark Office, Notice of Allowance issued in related U.S. Appl. No. 14/839,318 dated Aug. 15, 2018.

* cited by examiner

| SI No | CEC | Primary Domain | Owning Domain | Start Time | End Time |
|---|---|---|---|---|---|
| 1 | Server-1A | Customer A | Customer A | N/A | N/A |
| 2 | Server-2A | Customer A | Customer A | N/A | N/A |
| 3 | Server-3A | Customer A | Customer C | 1:00 AM | 6:00 PM |
| 4 | Server-4A | Customer A | Customer A | N/A | N/A |
| 5 | Server-1B | Customer B | Customer B | N/A | N/A |
| 6 | Server-2B | Customer B | Customer C | 2:00 PM | 11:00 PM |
| 7 | Server-3B | Customer B | Customer B | N/A | N/A |
| 8 | Server-4B | Customer B | Customer B | N/A | N/A |
| 9 | Server-1C | Customer C | Customer C | N/A | N/A |
| 10 | Server-2C | Customer C | Customer C | N/A | N/A |
| 11 | Server-3C | Customer C | Customer C | N/A | N/A |

DYNAMIC MANAGEMENT OF COMPUTING PLATFORM RESOURCES

FIELD OF THE INVENTION

The present invention relates to computing systems, and more particularly to management of logically partitioned computing resources and the allocation of such logically partitioned computing resources.

BACKGROUND OF THE INVENTION

Modern requirements for a computer system may require that a computer be utilized to run several operating environments, or operating systems, at once. In a typical embodiment, a logically partitioned data processing system may run a plurality of operating systems in one or more logical partitions. Each operating system resides in a logical partition, with each logical partition allocated at least part of a processor, an entire processor, or multiple processors from the computer. Moreover in data processing systems of cloud computing environments, computing resources of the data processing system may be allocated to different customers.

Consequently, there is a continuing need for improving management of computing resources in data processing systems and particularly data processing systems implemented in cloud computing environments.

SUMMARY OF THE INVENTION

Embodiments of the invention provide for systems and computer program products for the management of logically partitioned computing resources of a data processing system configured with a plurality of hypervisors that each manages one or more logical partitions of the computing resources. The data processing system is configured with a plurality of domains, and allocated to each domain are one or more hypervisors and logical partitions managed by such allocated one or more hypervisors. For a first domain, a token is received from a second domain. The token identifies an amount and type of available computing resources of the second domain that are available for temporary allocation. The data processing system determines whether the available computing resources of the second domain are needed by the first domain based at least in part on the received token. In response to determining that the available computing resources are needed by the first domain, the available computing resources are temporarily allocated to the first domain for use thereby.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 14 is a table that provides an example temporary allocation of computing resources of the data processing system of FIG. 1.

DETAILED DESCRIPTION

Figure 1:
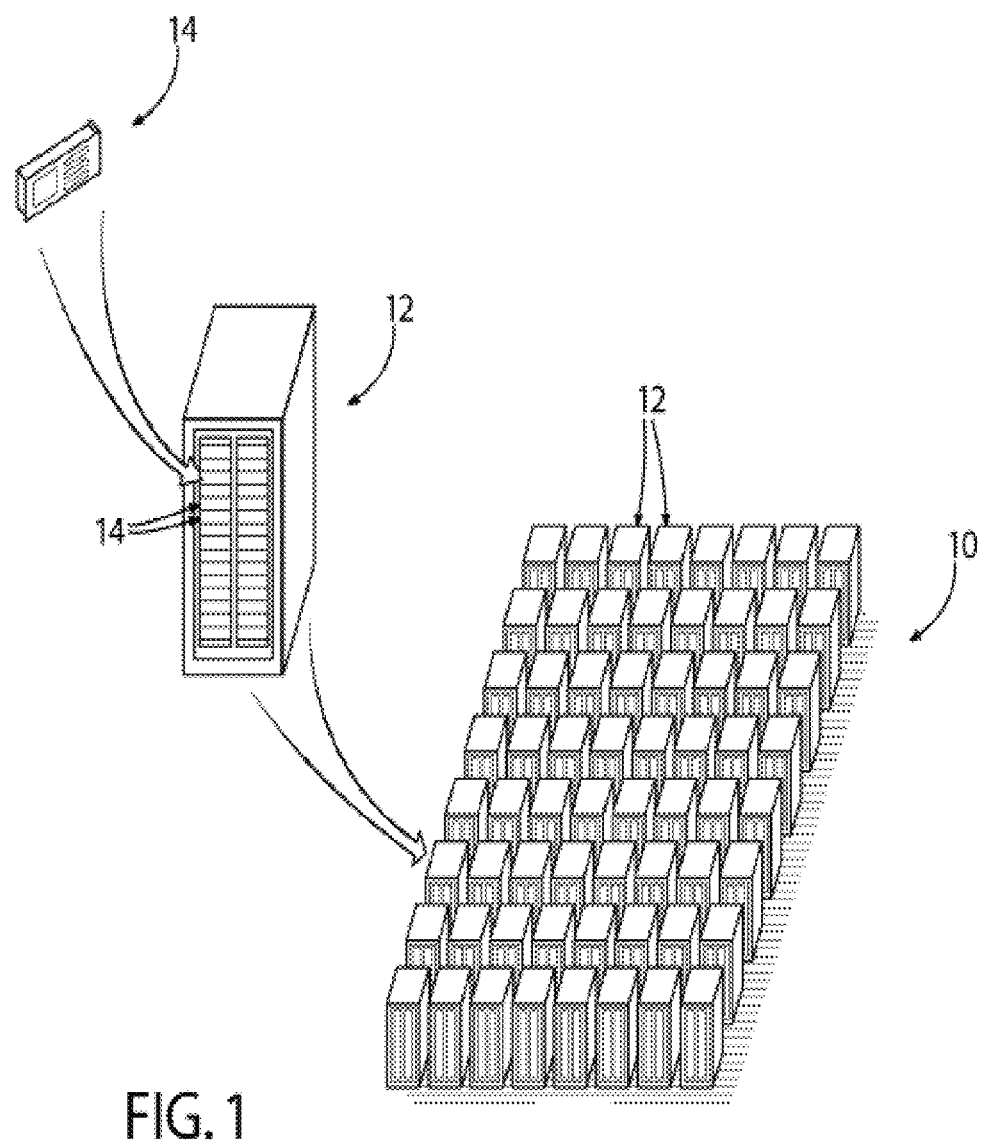
FIG. 1 provides a block diagram of a hardware components of a data processing system and/or platform that may be logically partitioned consistent with embodiments of the invention.

Embodiments of the invention provide systems, methods, and computer program products that manage platform resources of a data processing system. Consistent with embodiments of the invention, the data processing system may be configured with logically partitioned computing resources, and the data processing system may be configured with a plurality of hypervisors that each manages one or more logical partitions of the computing resources. In general, domains may be determined for the data processing system. As will be appreciated, a domain generally comprises at least one hypervisor and one or more logical partitions of computing resources that may be managed by the at least one hypervisor. For a data processing system all computing resources may be allocated to one or more domains such that clients and/or workloads may be domain specific and may only cause operations to be performed on a specific domain. In some embodiments, some of the domains may correspond to customers (e.g., cloud computing clients). For each domain, one or more hypervisors may be allocated to the domain such that the logical partitions managed by the allocated hypervisors are allocated to the domain. In some embodiments, one domain of the plurality may be a default domain, into which all hypervisors are initially allocated. As clients of the data processing system utilize the data processing system for processing workloads, hypervisors may be allocated to domains.

Allocation of a hypervisor to a domain may reserve the logically partitioned computing resources of the hypervisor for clients (and users of such clients) associated with the domain. In a data processing system processing workloads for a plurality of clients, allocating logically partitioned computing resources to domains may thereby isolate computing resources such that only clients associated with the domain can use/access such computing resources. As will be appreciated, in a data processing system implemented for a cloud computing environment, the isolation of computing resources may be needed to facilitate use of the data processing system by a plurality of clients/customers. For example, isolation of the hypervisors and logically partitioned resources may prevent hardware cache poisoning, possible cache attacks, possible performance impacts resulting from shared resources, etc.

Consistent with embodiments of the invention, sharing of computing resources within a domain may be supported, such that a virtual machine created in a first hypervisor of a domain may be migrated to a second hypervisor of the domain if additional computing resources are needed. However, virtual machine creation, migration, booting, and/or processing may be restricted across domains, such that a user not associated with a particular domain may not create, migrate, and/or boot a virtual machine on computing resources allocated to the particular domain. Generally, logically partitioned computing resources allocated to a particular domain will not be accessible/visible to clients and hypervisors of other domains. Therefore, embodiments of the invention facilitate management of computing resources of a data processing system by allocating logical partitions of such computing resources to domains.

Numerous variations and modifications will be apparent to one of ordinary skill in the art, as will become apparent from the description below. Therefore, the invention is not limited to the specific implementations discussed herein.

Hardware and Software Environment

Turning now to the figures, and particularly to FIG. 1, this figure is a diagrammatic illustration of a data processing system 10 that includes one or more interconnected servers 12, where each server includes one or more processing nodes 14. As will be appreciated, the computing resources of the data processing system 10 may be utilized by one or more customers/clients to process workloads. Consistent with embodiments of the invention, the management of the computing resources of the data processing system 10 for each client may include allocation of the computing resources to domains.

Figure 2:
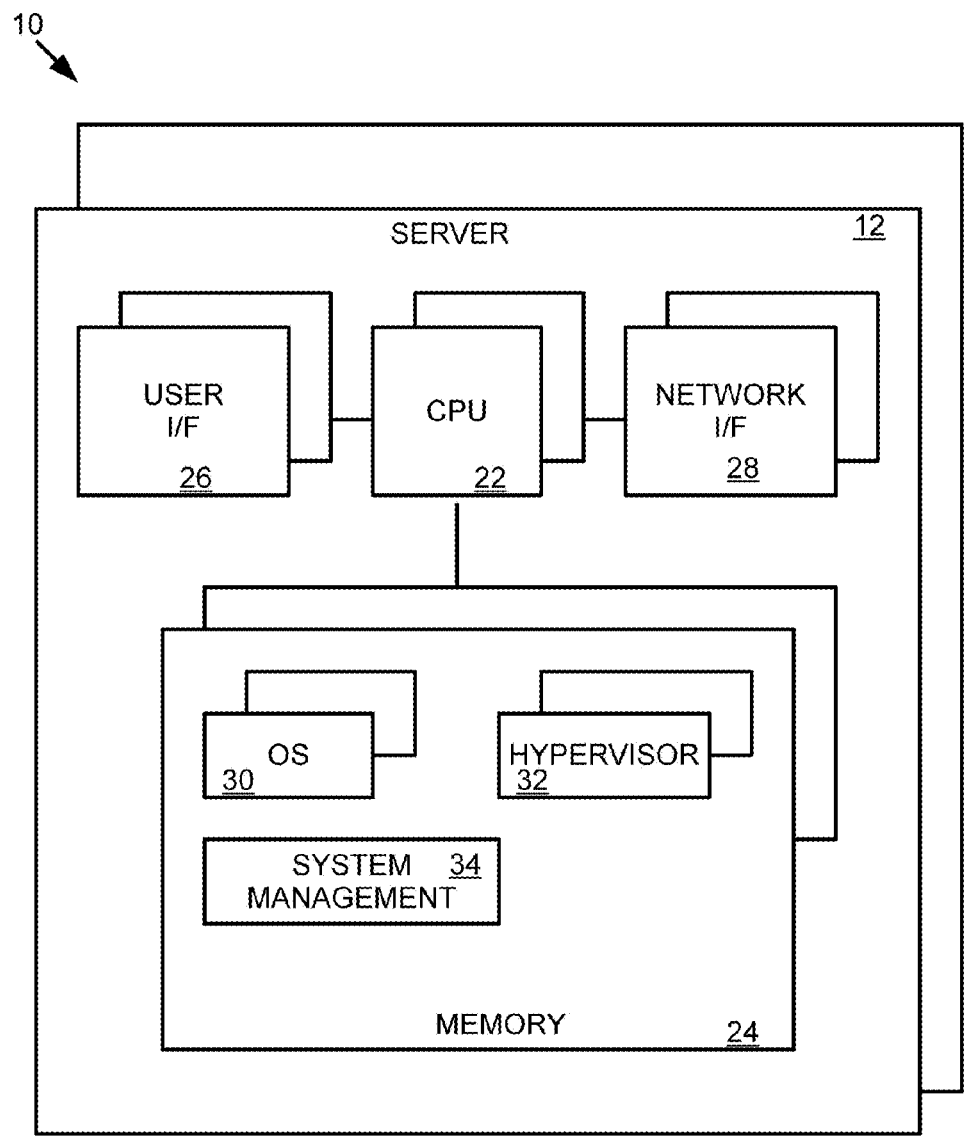
FIG. 2 provides a block diagram of components of a server of the data processing system of FIG. 1.

Turning now to FIG. 2, this figure provides a block diagram illustrating components of the data processing system 10 consistent with some embodiments of the invention. As shown, the data processing system 10 includes one or more servers 12 that comprise one or more processors 22 including at least one hardware-based microprocessor and one or more memory resources 24 coupled to the processors 22. In general, the processors 22 and memory resources 24 of each server 12 may be configured on one or more processing nodes 14 of the server 12. The memory resources 24 may comprise memory modules and many include, for example, random access memory (RAM) devices comprising the main storage of the data processing system 10, as well as any supplemental levels of memory, e.g., cache memories, non-volatile or backup memories (e.g., programmable or flash memories), read-only memories, etc. In addition, memory resources 24 may be considered to include memory storage physically located elsewhere in the data processing system 10, e.g., any cache memory in a microprocessor, as well as any storage capacity used as a virtual memory, e.g., as stored on a mass storage device or on another computer coupled to the data processing system 10. In general, memory resources 24 may be organized into one or more memory pages and/or memory locations that may be distributed among one or more memory modules configured in the data processing system 10.

For interface with a user or operator, the data processing system 10 may include a user interface 26 incorporating one or more user input/output devices, e.g., a keyboard, a pointing device, a display, a printer, etc. Otherwise, data may be communicated to and from another computer or terminal over a network interface 28 coupled to a communication network (e.g., the Internet, a local area network, a wide area network, a cellular voice/data network, one or more high speed bus connections, interchassis communication connects, and/or other such types of communication networks). The data processing system 10 also may be in communication with one or more mass storage devices, which may be, for example, internal hard disk storage devices, external hard disk storage devices, external databases, storage area network devices, etc. As will be appreciated, physical resources may refer to the processors 22, memory resources 24, user interface components 26, and/or network interface components 28.

For a logically-partitioned data processing system 10, the data processing system may operate under the control of one or more operating systems 30 and may execute or otherwise rely upon various computer software applications, components, programs, objects, modules, engines, data structures, etc. Moreover, the data processing system may include one or more instances of a hypervisor 32, where such hypervisors 32 generally manage execution of the operating systems 30 on the physical resources (e.g., processors 22 and memory 24) by virtualizing the physical resources into virtualized hardware resources. Consistent with embodiments of the invention, the data processing system may further operate under the control of a system management component 34. In general, the system management component manages the allocation of computing resources and/or hypervisors to domains and enforces policy restrictions associated with such domains. As will be appreciated, the system management component may provide an interface through which administrators may set policies, configurations, and/or attributes for the data processing system, hypervisors, and/or computing resources. In general, the hardware resources and/or virtualized hardware resources may be referred to as computing resources and/or platform resources. For instance, a hypervisor 32 may intercept requests for resources from operating systems 30 to globally share and allocate resources. The hypervisor 32 may allocate physical processing cycles of shared processor 22 resources by way of virtual processors for a logical partition. As will be appreciated, the virtualization of the physical resources may be referred to as the computing resources of the data processing system 10, where such computing resources not only refer to the physical hardware resources, but may also refer to further refer to the virtualization thereof to divide usage of such physical resources based on processing cycles.

In general, each server 12 may comprise one or more processing nodes 14, where each processing node 14 may be configured with one or more processors 22, one or more memory resources 24, and/or other such hardware/physical resources (e.g., network interface adapters, high speed communication bus adapters, etc.). Therefore, a processor 22 may be considered local to a memory resource 24 configured on a common processing node. The processor 22 may be considered non-local to memory resources 24 not configured on the same processing node.

Figure 3:
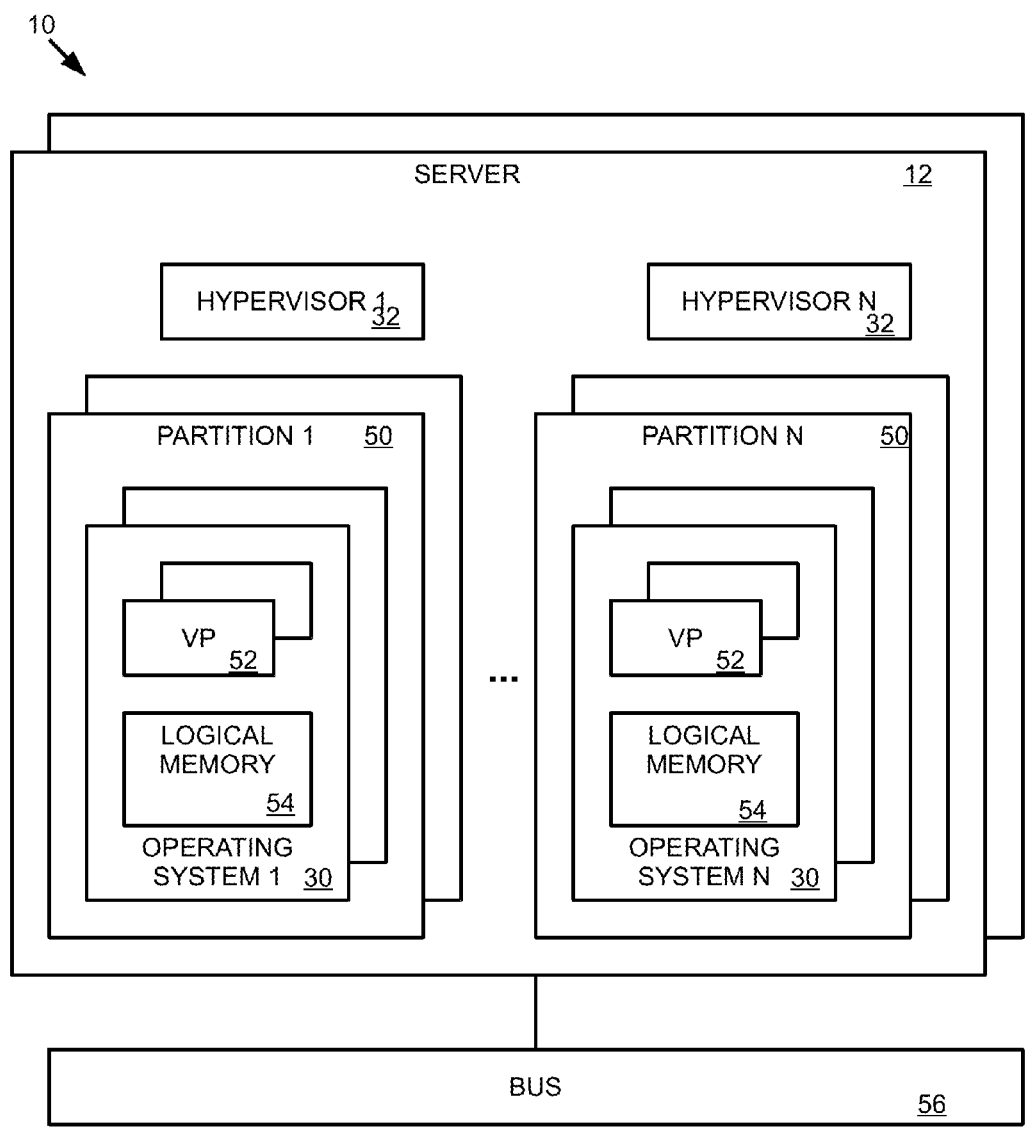
FIG. 3 provides a block diagram of a logical partition configuration that may be implemented on one or more servers of the data processing system of FIG. 1.

FIG. 3 provides a block diagram of a virtual processing environment that may be implemented in the data processing system of FIG. 2. In FIG. 3, system 10 includes software components and resources that implement a logically partitioned processing environment comprising logically partitioned computing resources consistent with embodiments of the invention. As such, FIG. 3 may include a computing architecture characterized as a virtual machine design, such as virtual machine designs developed by International Business Machines Corporation. As shown, the data processing system 10 includes one or more servers 12 implementing a plurality of logical partitions 50 (labeled 'PARTITION 1' and 'PARTITION N') that may share computing resources of one or more processors 22 configured in one or more servers 12.

As shown, each logical partition 50 may host one or more operating systems 30 (labeled 'OPERATING SYSTEM 1' and 'OPERATING SYSTEM N'), where each operating system 30 may be allocated one or more virtual processors (labeled 'VP') 52 and logical memory 54, i.e., computing resources. In general, the processors 22 of the one or more servers 12 may execute software configured to simulate multiple virtual processors 52. In addition, the logical partitions 50 may logically comprise a portion of the data processing system's 10 memory resources 24 and/or other resources, which may be referred to as the logical memory 54 of a logical partition 50 that may be allocated to one or more operating systems 30 hosted on the logical partition 50. Collectively, the resources of a logical partition 50 may be referred to as computing resources of the logical partition 50. Each operating system 30 may control the primary operations of its logical partition 50 in a manner similar to the operating system of a non-partitioned computer. Each logical partition 30 may execute in a separate memory space, represented by logical memory 54.

Moreover, each logical partition 50 may be statically and/or dynamically allocated a portion of the available resources in the data processing system 10. For example and as discussed herein, each logical partition 50 may share one or more processors 22, as well as a portion of the available memory space for use in logical memory 54. In this manner, a given processor 22 may be utilized by more than one logical partition 50. As shown, a hypervisor 32 (labeled 'HYPERVISOR 1' to 'HYPERVISOR N') may manage one or more logical partitions 50 of the computing resources by assigning virtualized resources to one or more operating systems 30 executing thereon. In particular, for workload processing, a hypervisor 32 may divide processing cycles of hardware resources among the operating systems 30 of the logical partitions 50 to thereby perform tasks of one or more workloads of the operating systems 30.

Each logical partition 50 may be configured to implement a virtual machine, where a virtual machine is generally a software implementation of a machine that executes like physical computing resources. In general, a virtual machine supports the execution of an operating system, where the virtual machine emulates existing hardware architecture, such that multiple instances of virtual machines (and operating systems) may be implemented on the hardware/computing resources such that the computing resources are efficiently utilized.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1-3 is not intended to limit the present invention. Indeed, those skilled in the art will recognize that other alternative hardware and/or software environments may be used without departing from the scope of the invention.

Computing Resource Allocation and Management

Embodiments of the invention are generally directed to allocation and management of platform resources in a logically partitioned data processing system. In some embodiments of the invention, the data processing system may be implemented in a cloud computing platform/environment that supports and/or processes workloads of one or more clients. In some embodiments, the cloud computing environment implemented data processing system is a multi-client computing environment. Embodiments of the invention may allocate hypervisors of the data processing system to domains, where such allocation also allocates computing resources managed by the hypervisor to the domain.

Generally, security and performance present issues in data processing systems/platforms of cloud computing environments, since such environments generally host applications and sensitive data for different clients (e.g., customers). For example, one security and performance issue corresponds to maintaining server and/or virtual machine isolation between customers. Generally, security reasons, compliance rules, and/or performance impact at the virtual machine level may necessitate server, hypervisor, and/or virtual machine isolation. As another example, two clients (e.g., two customers) of a cloud computing platform may be competitors. In this example, the two clients may desire isolation of computing resources in the data processing system because of potential system/hardware cache poisoning, possible cache attacks, possible performance impacts resulting from shared resources, etc.

As will be appreciated, a cloud computing environment may comprise a plurality of hypervisors, where the hypervisors may serve a plurality of clients, where the clients may have different security and performance requirements. For example, a first client may not permit execution of a virtual machine with a hypervisor that is also executing a virtual machine for a second client. As another example, some clients may specify clients/customer with which they do not wish to share computing resources. Hence, in such cloud computing environments and data processing platforms and systems thereof computing resource management may be client specific, where the policies, settings, and requirements of each client may vary.

Embodiments of the invention provide a system for managing computing resources of a data processing system by allocating computing resources to domains. In some embodiments, for each client of a data processing system, the data processing system may comprise a respective domain. Each domain may be allocated resources based at least in part on performance requirements of a respective client. Furthermore, policies and/or settings may be uniquely defined for each domain, such that security and/or performance specifications for clients may be managed at the domain level. Therefore, embodiments of the invention improve computing resources management of cloud computing environments by facilitating a computing resource allocation level above hypervisor level. With such domain level computing resource allocation, hypervisor operations, user operations, and/or virtual machine actions may be securely managed on the domain. Moreover, allocation of the computing resources into one or more domains may facilitate computing resource allocation to each client based on performance requirements, and such allocation may facilitate computing resource sharing based on security policies of each client.

Figure 4:
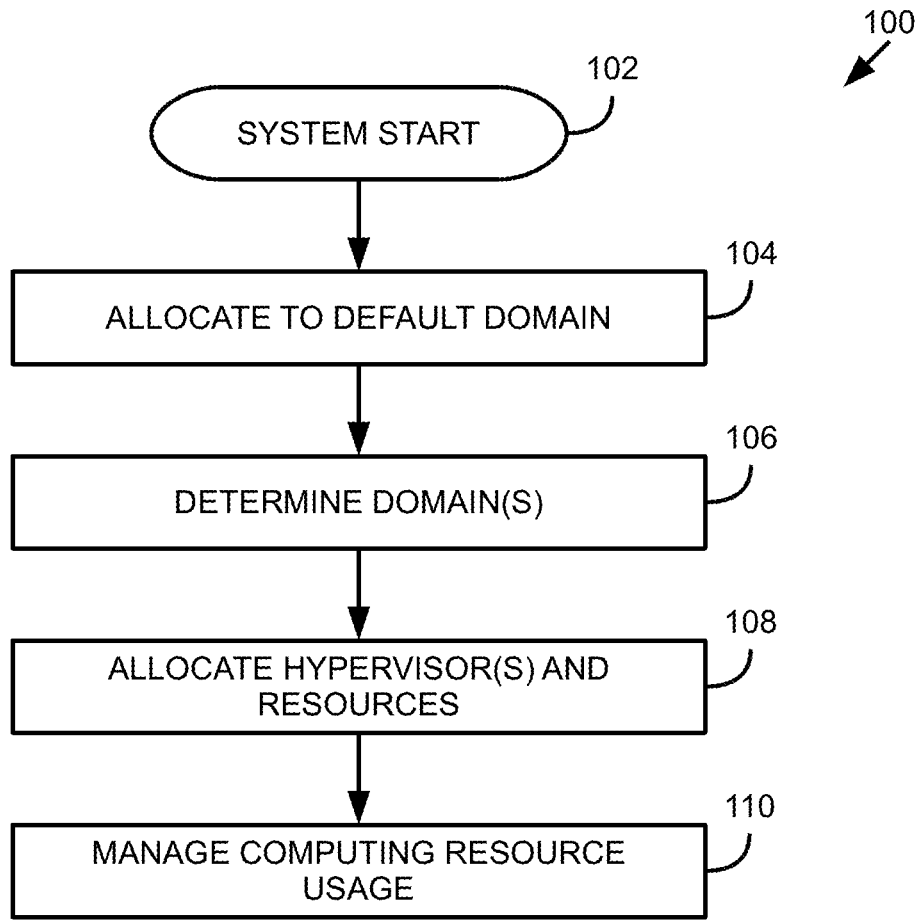
FIG. 4 is a flowchart that illustrates a sequence of operations that may be performed by the data processing system of FIG. 1 to manage computing resource usage of the data processing system of FIG. 1.

FIG. 4 provides flowchart 100 that illustrates a sequence of operations that may be performed by the data processing system 10 consistent with some embodiments of the invention to manage and/or allocate computing resources of the data processing system (i.e., platform resources). As shown, a data processing system may initialize/startup (block 102). In general, the data processing system is configured with logically partitioned computing resources that are managed by hypervisors. At startup, the data processing system may allocate all computing resources to a default domain (block 104). As will be appreciated, each hypervisor may generally have access to logical memory of logical partitions that the hypervisor manages, and in some embodiments of the invention, a domain identifier may be set in a memory associated with each hypervisor to thereby allocate each hypervisor to the default domain. In some embodiments of the invention, each hypervisor is associated with a non-volatile random access memory at which a domain identifier may be set.

Based on clients using the data processing system (i.e., customers of the data processing system), the data processing system may determine one or more domains (block 106). In some embodiments, the data processing system may determine a domain for each of the clients. As will be appreciated, a domain generally reserves computing resources only for clients associated with the domain. Therefore, in many applications, computing resource exclusivity may be desired. For example, if the data processing system is implemented as a cloud computing platform, a first client and a second client may utilize the data processing system for processing workloads. In this example, if the first client and second client are competitors, the first client and the second client may not wish to share resources. In this example, a first domain may be determined for the first client and a second domain may be determined for the second client.

The data processing system allocates one or more hypervisors to each determined domain (block 108). By allocating hypervisors to the domains, the data processing system allocates computing resources managed by each hypervisor to a respective domain. In general, allocation may be based at least in part on client computing requirements. For example, a domain for a client processing large workloads may be allocated more computing resources. In other embodiments, the computing resources of a data processing system may be allocated to each domain approximately evenly. Based on the allocation of the hypervisors to the domains, the computing resources of the data processing system are managed (block 110). In general, management of computing resource usage may include limiting access to computing resources of a first domain by hypervisors of a second domain, restricting virtual machine creation and/or migration, and/or restricting client actions based on a domain associated with a client. Furthermore, usage of computing resources may generally refer to utilization of the computing resources to perform operations. For example, usage of the computing resources may include, processing tasks of a workload with the computing resources, executing a virtual machine on the computing resources, performing operations associated with a user request with the computing resources, and/or other such actions, operations, etc.

Figure 5:
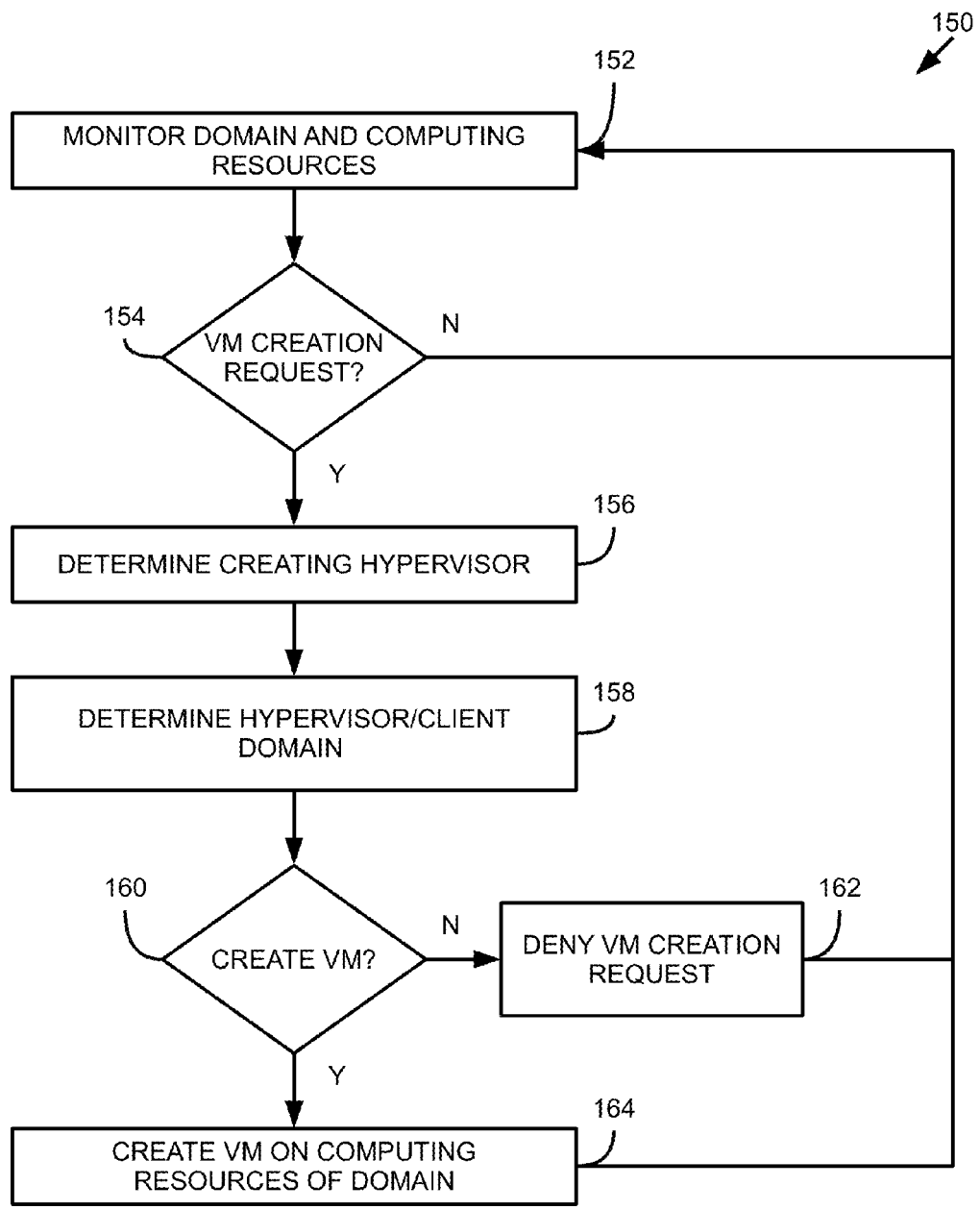
FIG. 5 is a flowchart that illustrates a sequence of operations that may be performed by the data processing system of FIG. 1 to manage computing resource usage of the data processing system of FIG. 1.

FIG. 5 provides a flowchart 150 that illustrates a sequence of operations that may be performed by the data processing system 10 consistent with some embodiments of the invention to manage computing resource usage of a domain. In these embodiments, the data processing system 10 may monitor the logically partitioned computing resources of a domain (block 152) to detect any virtual machine creation requests (block 154). If a virtual machine creation is not detected ("N" branch of block 154), the data processing system continues monitoring the computing resources of the domain (block 152). In response to detecting a virtual machine creation request for computing resources of the domain ("Y" branch of block 154), the data processing system determines the hypervisor attempting to create the virtual machine (block 156). The data processing system determines the domain of the creating hypervisor and the client associated with the virtual machine (block 158).

The data processing system determines whether to create the virtual machine on the computing resources of the domain based at least in part on the domain of the creating hypervisor and/or the domain associated with the requesting client (block 160). If the creating hypervisor and/or the requesting client are not associated with the domain ("N" branch of block 160), the data processing system denies the virtual machine creation request (block 162). If the creating hypervisor and/or the requesting client are associated with the domain ("Y" branch of block 160), the data processing system creates the virtual machine on the computing resources of the domain (block 164). After denying the virtual machine creation request (block 162) or creating the virtual machine (block 164), the data processing system continues monitoring the computing resources for the domain (block 152).

Figure 6:
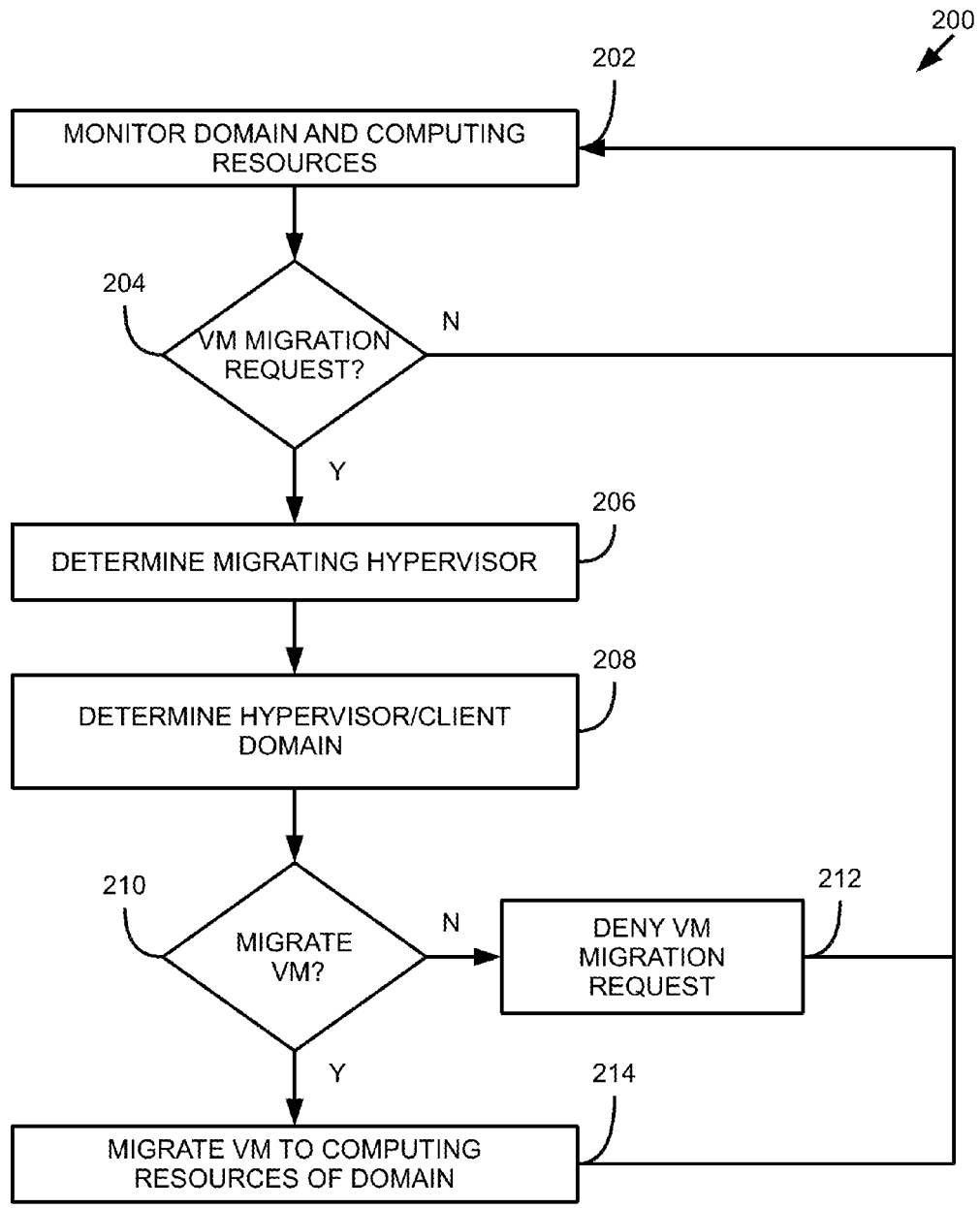
FIG. 6 is a flowchart that illustrates a sequence of operations that may be performed by the data processing system of FIG. 1 to manage computing resource usage of the data processing system of FIG. 1.

Turning now to FIG. 6, this figure provides a flowchart 200 that illustrates a sequence of operations that may be performed by the data processing system to manage computing resource usage of a domain consistent with embodiments of the invention. As shown, the data processing system may monitor computing resources allocated to a domain (block 202) to detect virtual machine migration to the computing resources of the domain (block 204). If the data processing system does not detect a virtual machine migration request for the computing resources of the domain ("N" branch of block 204), the data processing system continues monitoring the computing resources of the domain (block 202).

In response to detecting a virtual machine migration request to computing resources of the domain ("Y" branch of block 204), the data processing system determines the hypervisor requesting the migration (block 206). The data processing system determines the domain of the requesting hypervisor and/or client (block 208), and the data processing system determines whether to migrate the virtual machine based on the domain of the hypervisor and/or client and the domain of the computing resources (block 210).

If the hypervisor and/or client are not associated with the domain to which the computing resources are allocated ("N" branch of block 210), the data processing system denies the virtual machine migration request (block 212). If the requesting hypervisor and/or client is associated with the domain of the computing resources ("Y" branch of block 210), the data processing system migrates the virtual machine to the computing resources of the domain (block 214). After denying the virtual machine migration request (block 212) or migrating the virtual machine (block 214), the data processing system continues monitoring the computing resources for the domain (block 202).

Figure 7:
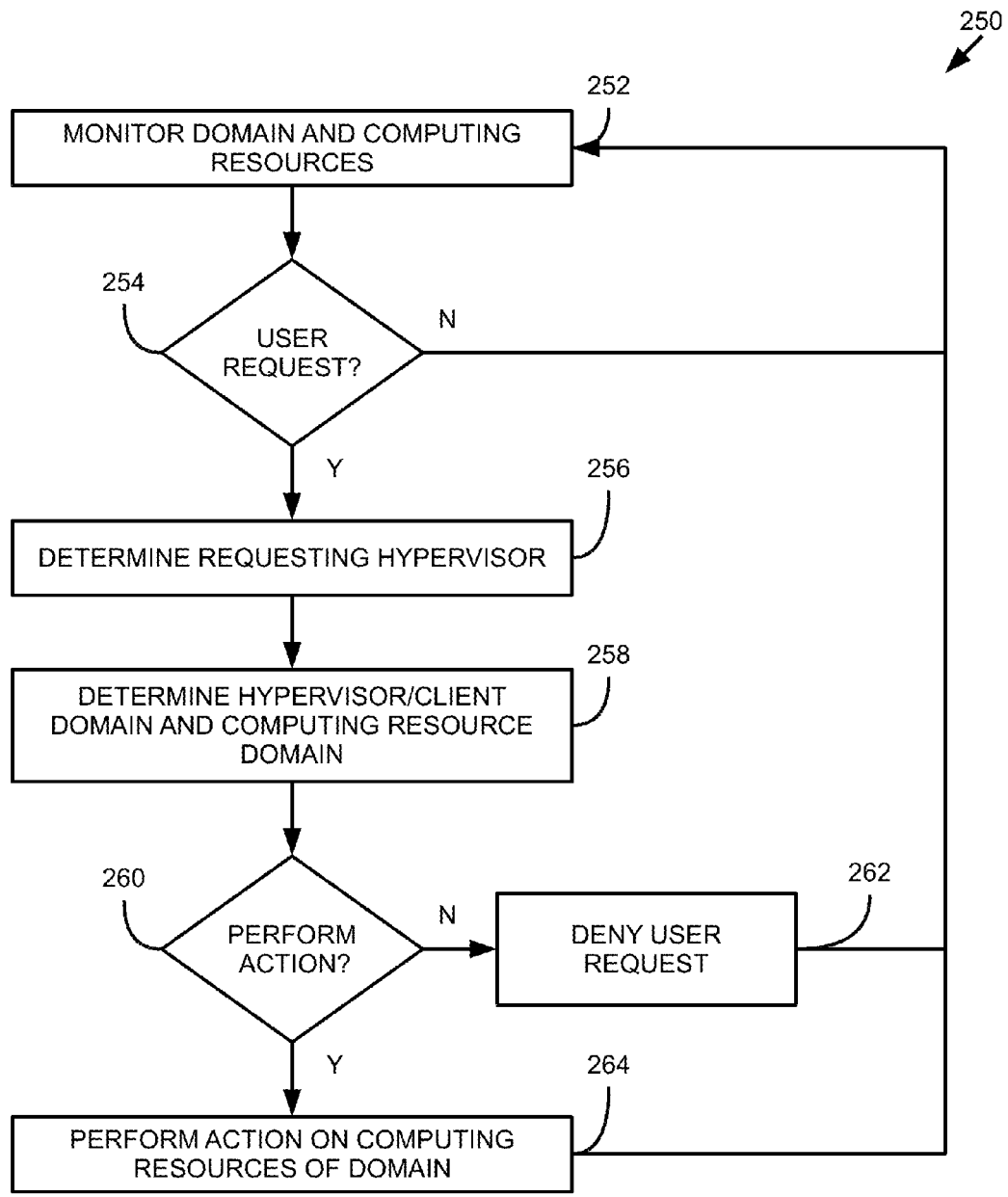
FIG. 7 is a flowchart that illustrates a sequence of operations that may be performed by the data processing system of FIG. 1 to manage computing resource usage of the data processing system of FIG. 1.

FIG. 7 provides a flowchart 250 that illustrates a sequence of operations that may be performed by the data processing system to manage usage of computing resources of a domain. As shown, the data processing system may monitor the computing resources of the domain (block 252) to detect an administrative action and/or user request (block 254). If the data processing system does not detect a user request for the computing resources of the domain ("N" branch of block 254), the data processing system continues monitoring the computing resources of the domain (block 252).

In response to detecting a user request for computing resources of the domain ("Y" branch of block 254), the data processing system determines the hypervisor associated with the user request (block 256). The data processing system determines the domain of the hypervisor associated with the user request and/or client (block 258), and the data processing system determines whether to perform an action of the user request based on the domain of the hypervisor and/or client and the domain of the computing resources (block 260). If the hypervisor and/or client are not associated with the domain to which the computing resources are allocated ("N" branch of block 260), the data processing system denies user request (block 262). If the requesting hypervisor and/or client is associated with the domain of the computing resources ("Y" branch of block 260), the data processing system performs the requested action on the computing resources of the domain (block 264). After denying the user request (block 262) or performing the requested action (block 264), the data processing system continues monitoring the computing resources for the domain (block 252).

Therefore, as shown in FIGS. 5-7, embodiments of the invention may manage usage of computing resources of the data processing system based on domains. In some embodiments, allocating computing resources and hypervisors to domains facilitates isolation of resources for different clients in a cloud computing environment. As will be appreciated, embodiments of the invention logically partition a data processing system into smaller entities, i.e., domains. Each domain may be represented by a profile in a system management component. Each domain may be allocated one or more hypervisors. Furthermore, embodiments of the invention may generally monitor logical partitions to detect virtual machine actions (i.e., virtual machine creation, virtual machine booting, and/or virtual machine migration), and embodiments of the invention may determine whether to permit or restrict such virtual machine action based at least in part on the domain of the logical partition, the domain of a hypervisor initiating such virtual machine action, and/or the domain of a user requesting such virtual machine action.

As described, operations, such as virtual machine migration, may be allowed only within a domain. Similarly, virtual machine creation may be restricted by domain and for authorized users (i.e., associated clients) of the respective domain. The computing resources allocated to a particular domain may not be accessible and/or visible to users of other domains. A system management component may restrict the visibility of hypervisors and/or computing resources to only those which are in the domain associated with a particular client. In general, a domain identifier may be stored as an attribute for each hypervisor of the data processing system in a memory associated with the hypervisor. As will be appreciated, allocation of hypervisors and/or computing resources may be hardware-assisted—i.e., the system management component comprising one or more hardware based processing units may execute program code configured to manage the one or more domains of the data processing system.

In some embodiments, virtual machine creation will be restricted such that a user may not create a virtual machine in a domain for which the user is not a member (i.e., associated therewith). Similarly, embodiments of the invention may restrict virtual machine migration such that a user may not migrate a virtual machine to a domain for which the user is not a member. In some embodiments, user control of hypervisors and/or computing resources may be restricted such that a user may not control (through one or more user requests and/or user actions) hypervisors and/or computing resources that are allocated to a domain for which the user is not a member.

In some embodiments of the invention, hypervisors and/or computing resources allocated to a domain may be temporarily allocated (i.e., loaned, leased, etc), to another domain. In these embodiments, a domain may temporarily host a virtual machine belonging to another domain. While a virtual machine and/or hypervisor of a first domain are temporarily allocated to and/or hosted on a second domain, the management component may restrict access of clients and/or hypervisors of the first domain to the temporarily allocated/hosted virtual machine or hypervisor.

Figure 8:
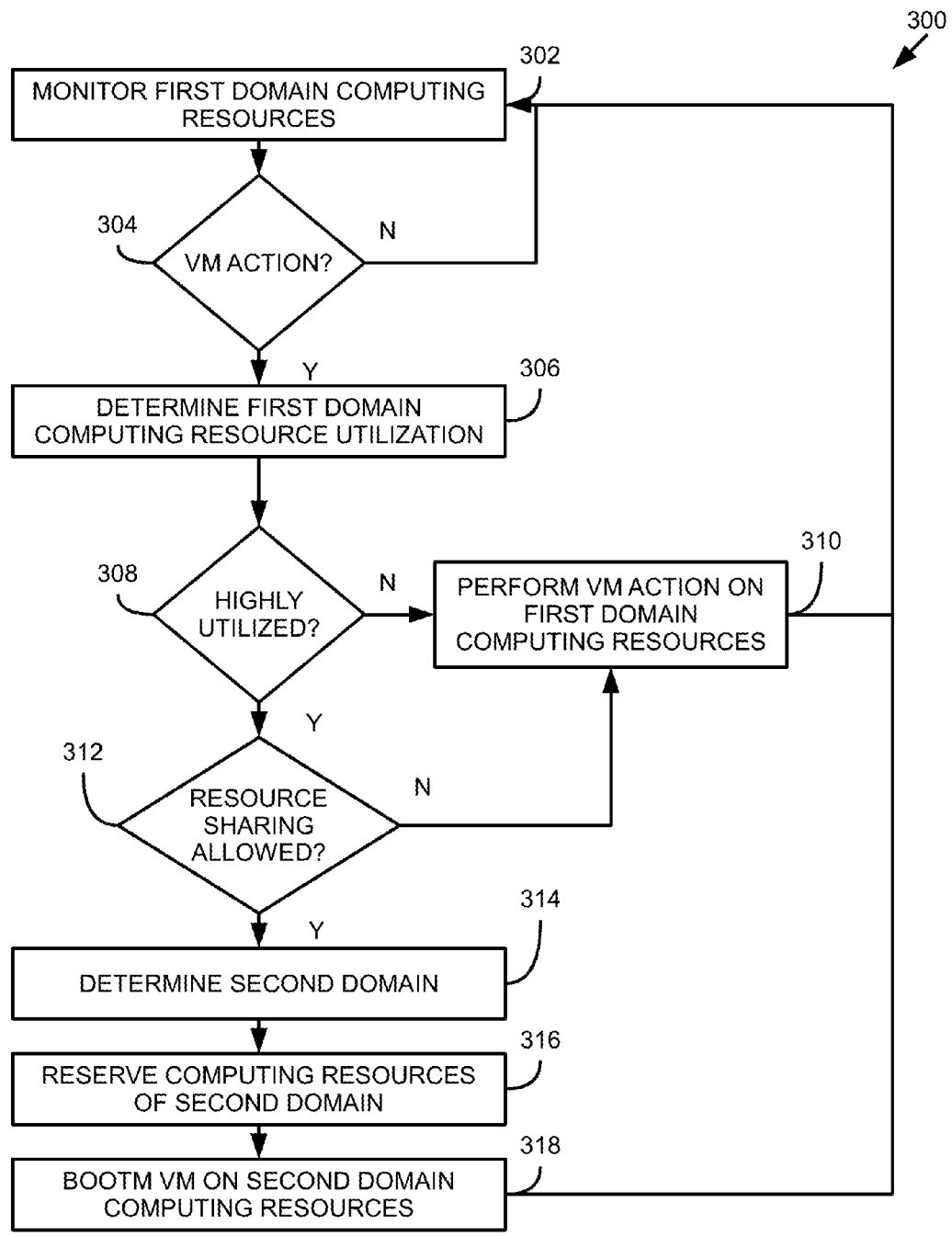
FIG. 8 is a flowchart that illustrates a sequence of operations that may be performed by the data processing system of FIG. 1 to manage computing resource usage of the data processing system of FIG. 1.

Turning now to FIG. 8, this figure provides a flowchart 300 that illustrates a sequence of operations that may be performed by the data processing system to manage computing resource usage of one or more domains consistent with embodiments of the invention. As shown, the data processing system monitors computing resource usage of a first domain 302) to determine whether a virtual machine action (e.g., migration of a virtual machine, booting of a virtual machine, creating a virtual machine) is being performed by a hypervisor of the first domain (block 304). If the data processing system does not detect that a virtual machine action is being performed ("N" branch of block 304), the data processing system continues monitoring the computing resources of the first domain (block 302).

In response to detecting a virtual machine action in the computing resources of the first domain ("Y" branch of block 304), the data processing system determines computing resource utilization of the first domain (block 306). In general, the computing resources of the first domain may be available or utilized. Availability indicates that the computing resources may be used to perform operations (e.g., process tasks) and/or allocated to a virtual machine such that the virtual machine may complete a virtual machine operation (e.g., for booting the virtual machine, migrating the virtual machine, and/or creating the virtual machine). However, if the computing resources are already being used for processing tasks (also referred to as busy and/or utilized), then the computing resources may not be used to perform other operations and/or allocated to a virtual machine for performance of virtual machine operations (such as booting a virtual machine, migrating a virtual machine, and/or creating a virtual machine). For example, if only two processors are available for a domain, and a virtual machine being booted requires six processors, in this example, the data processing system may determine that resources of the domain are not available for booting the virtual domain. Hence, as used herein, performing an operation may refer to allowing for allocation of computing resources to a virtual machine to complete a virtual machine operation (e.g., boot, migration, creation). Therefore, the data processing system determines whether the computing resources of the first domain are highly utilized (block 308). In general, highly utilized may be used to describe that the computing resources of a domain are not available due to usage such that additional operations may not be performed until completion of other operations. If the computing resources are not highly utilized ("N" branch of block 308), the data processing system boots the virtual machine on the computing resources of the first domain (block 310).

In response to determining that the computing resources are highly utilized ("Y" branch of block 308), the data processing system determines whether computing resource sharing is allowed for the first domain (block 312), i.e., whether any policies/restrictions of the first domain prohibit computing resource sharing (i.e., borrowing/loaning) of resources. If the first domain does not allow computing resource sharing ("N" branch of block 312), the data processing system performs the virtual machine action on the computing resources of the first domain (block 310). Since the computing resources are highly utilized, the virtual machine action may be queued until computing resources in the first domain become available. If the first domain allows resource sharing ("Y" branch of block 312), the data processing system determines a second domain having available computing resources, where the second domain also allows resource sharing (block 314). The data processing system reserves (e.g. temporarily allocates) computing resources of the second domain for performing the virtual machine action associated with the first domain (block 316), and the data processing system performs the virtual machine action on the reserved computing resources of the second domain (block 318), where the temporarily allocated resources of the second domain may be managed by a data processing system of the first domain.

As will be appreciated, a virtual machine action may be booting a virtual machine, creating a new virtual machine, and/or migrating a virtual machine. For any resource sharing across domains, domain attributes/policies may be checked to determine whether a desired level of computing resource sharing is permitted. For example, a security policy of a particular domain may not permit hosting a virtual machine on computing resources of another domain.

Figure 9:
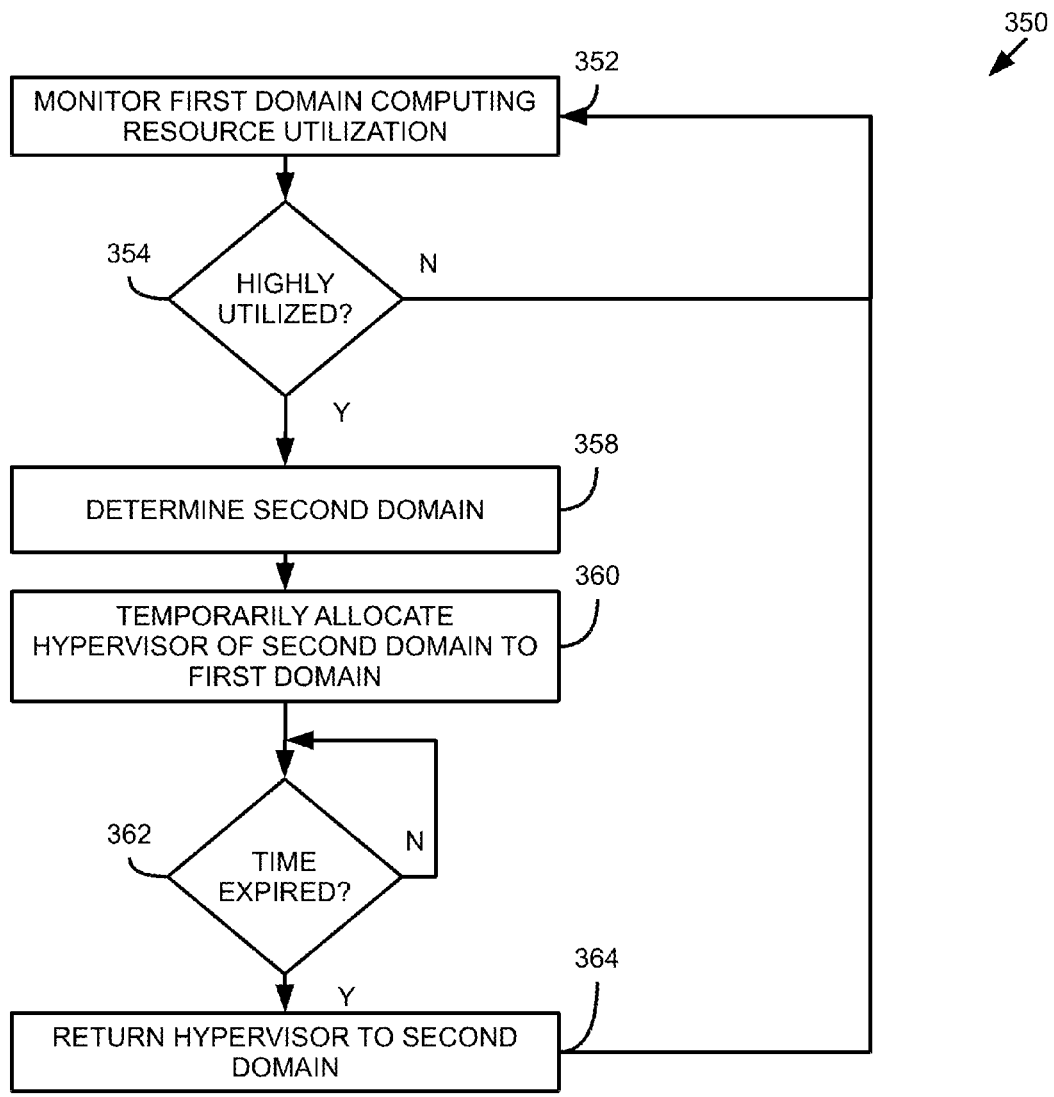
FIG. 9 is a flowchart that illustrates a sequence of operations that may be performed by the data processing system of FIG. 1 to manage computing resource usage of the data processing system of FIG. 1.

FIG. 9 provides a flowchart 350 that illustrates a sequence of operations that may be performed by the data processing system to manage computing resources of the one or more domains of the data processing system consistent with embodiments of the invention. The data processing system monitors usage of the computing resources of a domain (block 352) to detect when the computing resources of the first domain are highly utilized (block 354). While the computing resources of the first domain are not highly utilized ("N" branch of block 354), the data processing system continues monitoring the computing resources of the first domain (block 352).

In response to detecting that the computing resources of the first domain are highly utilized, the data processing system determines a second domain that has an available hypervisor and supports computing resource sharing (block 358). The data processing system temporarily allocates the available hypervisor of the second domain to the first domain for a predefined time limit (block 360). Generally, the time limit may be determined based on a policy associated with the first domain, the second domain, a workload associated with the first domain, a workload associated with the second domain, and/or other such factors. The data processing system maintains the temporarily allocated hypervisor (and the computing resources managed by the hypervisor) at the first domain for the duration of the time limit (block 362). When the time limit expires ("Y" branch of block 362), the data processing system returns the hypervisor (and the computing resources managed thereby) to the second domain (block 364).

Figure 10:
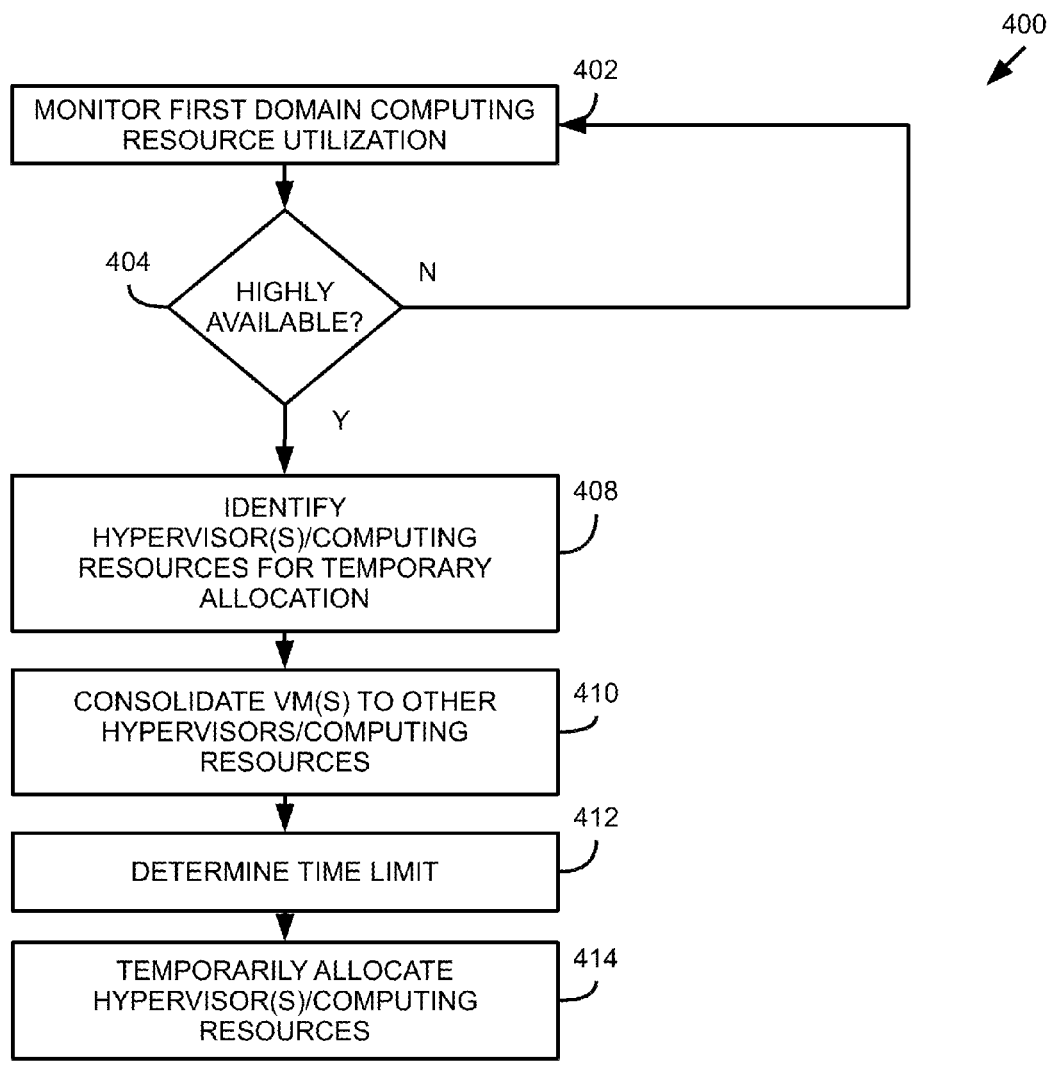
FIG. 10 is a flowchart that illustrates a sequence of operations that may be performed by the data processing system of FIG. 1 to manage computing resource usage of the data processing system of FIG. 1.

In some embodiments of the invention, the data processing system may monitor computing resources of a domain to determine when computing resources of the domain are highly available. In such embodiments, the data processing system may consolidate virtual machines of the domain to a subset of hypervisors and/or computing resources allocated to the domain such that hypervisors and/or computing resources not of the subset may be temporarily allocated to other domains. FIG. 10 provides a flowchart 400 that illustrates a sequence of operations that may be performed by the data processing system to manage computing resources of one or more domains of the data processing system consistent with embodiments of the invention. The data processing system monitors usage of the computing resources of a domain (block 402) to detect when the computing resources of the first domain are highly available (block 404). As will be appreciated, highly available computing resources generally correspond to resources for which at least some processing cycles are not utilized or at least not utilized fully. For example, computing resources for which tasks have not been assigned may be considered highly available. As another example, computing resources for which some tasks have been assigned, but for which not all processing cycles are utilized may be considered highly available. As another example, for a domain, if tasks of a first set of computing resources may redistributed to a second set of computing resources of the domain such that the first set of computing resources may not be utilized, the computing resources of the first set of computing resources may be highly available. While the computing resources of the first domain are not highly available ("N" branch of block 404), the data processing system continues monitoring the computing resources of the first domain (block 402).

In response to detecting that the computing resources of the first domain are highly available ("Y" branch of block 404), the data processing system identifies one or more hypervisors and/or a first set of computing resources that may be temporarily allocated (block 408). The data processing system consolidates any virtual machines of the identified hypervisor and/or first set of computing resources to other hypervisors and/or computing resources of the domain (block 410). The data processing system determines a time limit for temporary allocation of the hypervisor and/or first set of computing resources (block 412). In general, the time limit may be determined based at least in part on one or more policies/settings of the domain and/or the data processing system. In addition, the time limit may be determined based at least in part on at least one workload associated with the domain. For example, if all tasks of a workload assigned to the domain have been processed, the data processing system may determine a time limit that anticipates assignment of a second workload such that the hypervisor and/or computing resources may be returned prior to assignment of the second workload. Generally, a determined time limit may comprise a determined start time and a determined end time for a temporary allocation period (i.e., loan period). Moreover, one or more policies/settings of the domain may define a minimum and/or maximum time limit for which computing resources may be temporarily allocated. The data processing system may temporarily allocate the one or more hypervisors and/or computing resources (block 414) for the determined time limit.

In general, temporary allocation of a hypervisor and computing resources allocated thereto may be utilized in data processing systems having one or more domains that do not permit computing resource sharing. By temporarily allocating a hypervisor and computing resources of a first domain to a second domain, the temporarily allocated hypervisor and computing resources may be isolated from other hypervisors and computing resources of the first domain. Therefore, these embodiments may facilitate resource sharing/management in a cloud computing environment having domains that generally do not permit sharing of resources due to security and/or performance settings/rules.

In some embodiments of the invention, computing resource sharing across domains may be managed using a token based allocation system. In these embodiments of the invention, a management hypervisor of each domain may monitor computing resource availability of the domain. A management hypervisor may be selected from among a plurality of hypervisors allocated to a domain based at least in part on availability of computing resources of each of the hypervisors. For example, a hypervisor allocated to a domain having high availability may be selected as a management hypervisor. Periodically, the management hypervisor of each domain may communicate tokens therebetween, where the tokens may indicate computing resources available for the management hypervisor's domain. As will be appreciated, resource tokens may be communicated from management hypervisors to other management hypervisors. Generally, a token may include a domain identifier, an amount of computing resources (e.g., processing units, memory, and/or virtualizations thereof) available for loaning, and/or a time limit/duration for which the computing resources are available for loaning. After any loaning of computing resources, every domain of the data processing system may update an internal map of available, free, and/or busy resources that are temporarily loaned (i.e., temporarily allocated) to other domains.

A domain in need of additional computing resources may (i.e., the computing resources allocated to the domain are highly utilized) communicate resource requests to other domains having available computing resources. A requesting domain may identify other domains having available computing resources based at least in part on tokens received from a management hypervisor of each of the other domains. Domains that receive a resource request may determine computing resources to temporarily allocate responsive to the received request. A domain that temporarily allocates computing resources for a request may update an internal computing resource allocation map, where the map may include information regarding all hypervisors, virtual machines, and/or computing resources of the domain. As will be appreciated tokens, requests, and/or responses may be encrypted to add additional layers of security between domains of a data processing system that implements a cloud computing environment.

Figure 11:
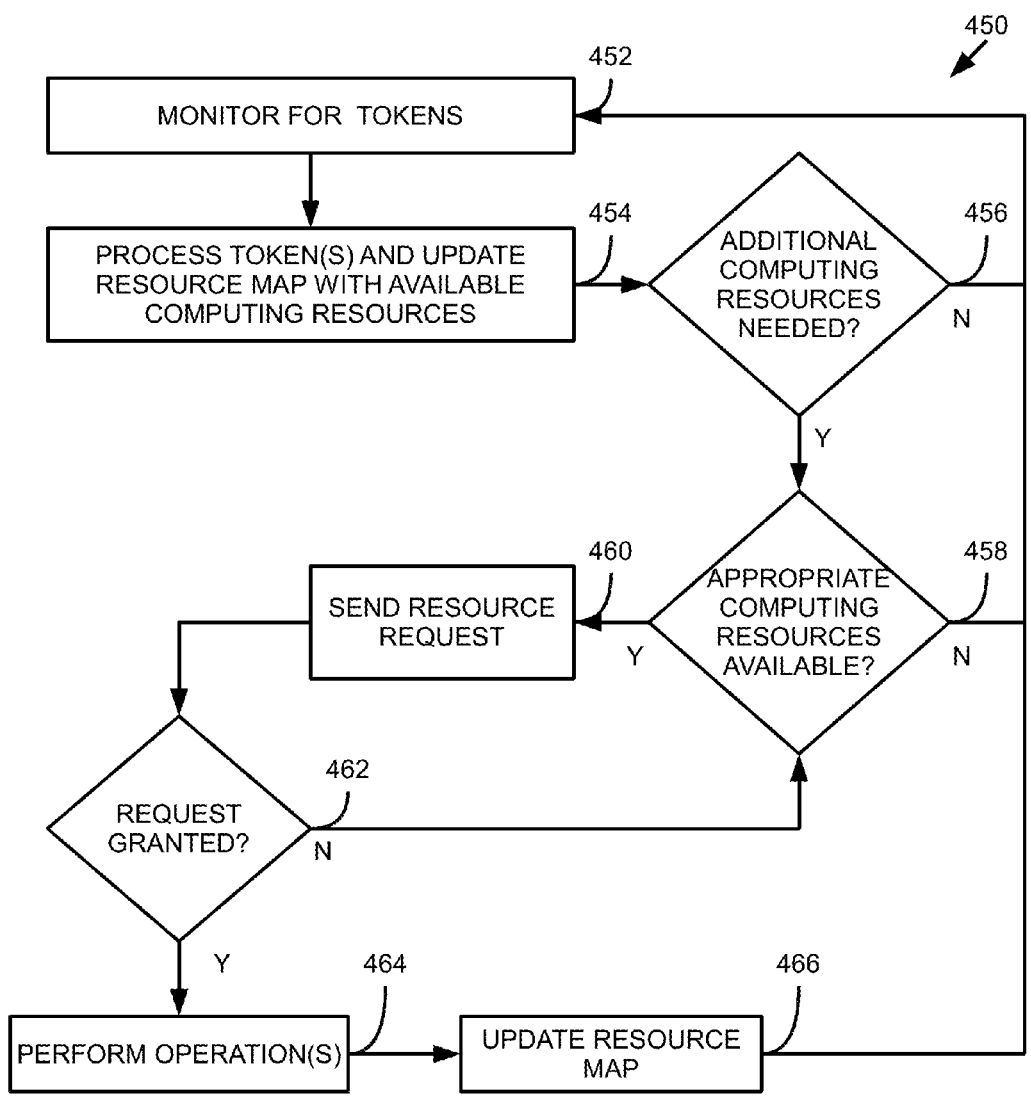
FIG. 11 is a flowchart that illustrates a sequence of operations that may be performed by the data processing system of FIG. 1 to manage computing resource usage of the data processing system of FIG. 1.

FIG. 11 provides a flowchart 450 that illustrates a sequence of operations that may be performed by the data processing system to manage computing resources of the data processing system consistent with some embodiments of the invention. A first management hypervisor of a first domain may monitor for tokens communicated from one or more other management hypervisors of other domains (block 452). The first management hypervisor processes the one or more tokens to update a computing resource map maintained for the first domain (block 454). In general a computing resource map for a domain may include information that identifies computing resources/hypervisors allocated (and temporarily allocated) to the domain, a status (i.e., available, busy, etc.) of such allocated computing resources/hypervisors, and/or computing resources/hypervisors of other domains available for temporary allocation. The first management hypervisor determines whether additional computing resources are needed for any operations being performed by the first domain (e.g., virtual machine creation, virtual machine booting, virtual machine migration, etc.) (block 456).

If additional computing resources are not needed ("N" branch of block 456), the first management hypervisor continues monitoring for tokens (block 452). In response to determining that additional computing resources are needed for operations of the first domain ("Y" branch of block 456), the first management hypervisor analyzes the resource map of the first domain to determine if the appropriate computing resources are available for temporary allocation from another domain (block 458). As will be appreciated, the resource map for the first domain indicates computing resources that are available for temporary allocation from other domains. Moreover, the resource map indicates any relevant information associated with such available computing resources, including for example, the type of computing resource (e.g., processor, memory, virtualized processor, virtualized memory, network interface, etc.), quantity, time limit, etc. Therefore, the first management hypervisor determines whether the types and/or amount of computing resources available from other domains meet the additional needs of the first domain.

In response to determining that the appropriate computing resources are not available from other domains ("N" branch of block 458), the first management hypervisor continues monitoring for tokens from other management hypervisors (block 452). In response to determining that the appropriate computing resources are available from other domains ("Y" branch of block 458), the first management hypervisor communicates a resource request to a second management hypervisor associated with a second domain that has the appropriate computing resources available for temporary allocation (block 460). Since computing resource availability may change after communication of a token, the resource request sent by the first management hypervisor may be rejected by the second management hypervisor if the computing resources are no longer available. Furthermore, the resource request may be rejected by the second management hypervisor if a policy/security setting of the first domain and/or the second domain does not permit sharing therebetween. Therefore, the first management hypervisor receives an indication whether the request was granted (block 462). If the request is not granted by the second management hypervisor ("N" branch of block 462), the first management hypervisor determines whether any other domains have appropriate computing resources available for temporary allocation (block 458). If the request is granted ("Y" branch of block 462), the operations needing the additional computing resources are performed in the first domain using the temporarily allocated computing resources (block 464), and the resource map of the first domain is updated to reflect the temporary allocation of computing resources thereto (block 466).

Therefore, embodiments of the invention provide systems, methods, and computer program products for managing computing resources of a data processing system by allocating computing resources and hypervisors to domains. In some embodiments, the data processing system may be implemented in a cloud computing platform, for which one or more clients/users may utilize computing resources of the data processing system for processing workloads. Embodiments of the invention allow computing resources and processes/operations of different clients to be isolated. In particular, a first set of virtual machines may be isolated from running on a common hypervisor as a second set of virtual machines to provide for increased security and/or reduced performance concerns. Furthermore, computing resources and/or hypervisors may be shared securely across domains to facilitate efficient utilization of virtualized computing resources. As will be appreciated, different clients (e.g., departments, companies, etc.) may be allocated computing resources using domains, such that some computing resources and hypervisors may be reserved in the data processing system. As will be appreciated, embodiments of the invention allow secure virtual machine creation, migration, booting within a domain.

Embodiments of the invention may allocate hypervisors and/or computing resources to domains of a data processing system with a hardware assisted management mechanism. For each hypervisor, a primary domain identifier may be stored as an attribute of the hypervisor in a memory associated with the hypervisor, e.g., a non-volatile memory associated with the hypervisor. All hypervisors having a common primary domain identifier are allocated to a common domain associated with such primary domain identifier. Allocation of a hypervisor (and the computing resources managed by the hypervisor) to a particular domain may be performed by an administrator and/or dynamically. In addition, each hypervisor may include an owning domain identifier as an attribute that may be stored in a memory associated with the hypervisor. In general, the owning domain identifier corresponds to a domain to which the hypervisor is allocated, even temporarily. Hence, when a hypervisor is temporarily allocated from a first domain to a second domain, the owning domain identifier may be set to identify the second domain, while the primary domain identifier identifies the first domain. When a temporary allocation period (also referred to as a loan period) expires, the owning domain identifier of the hypervisor is reset such that the owning domain identifier identifies the first domain.

Figure 12:
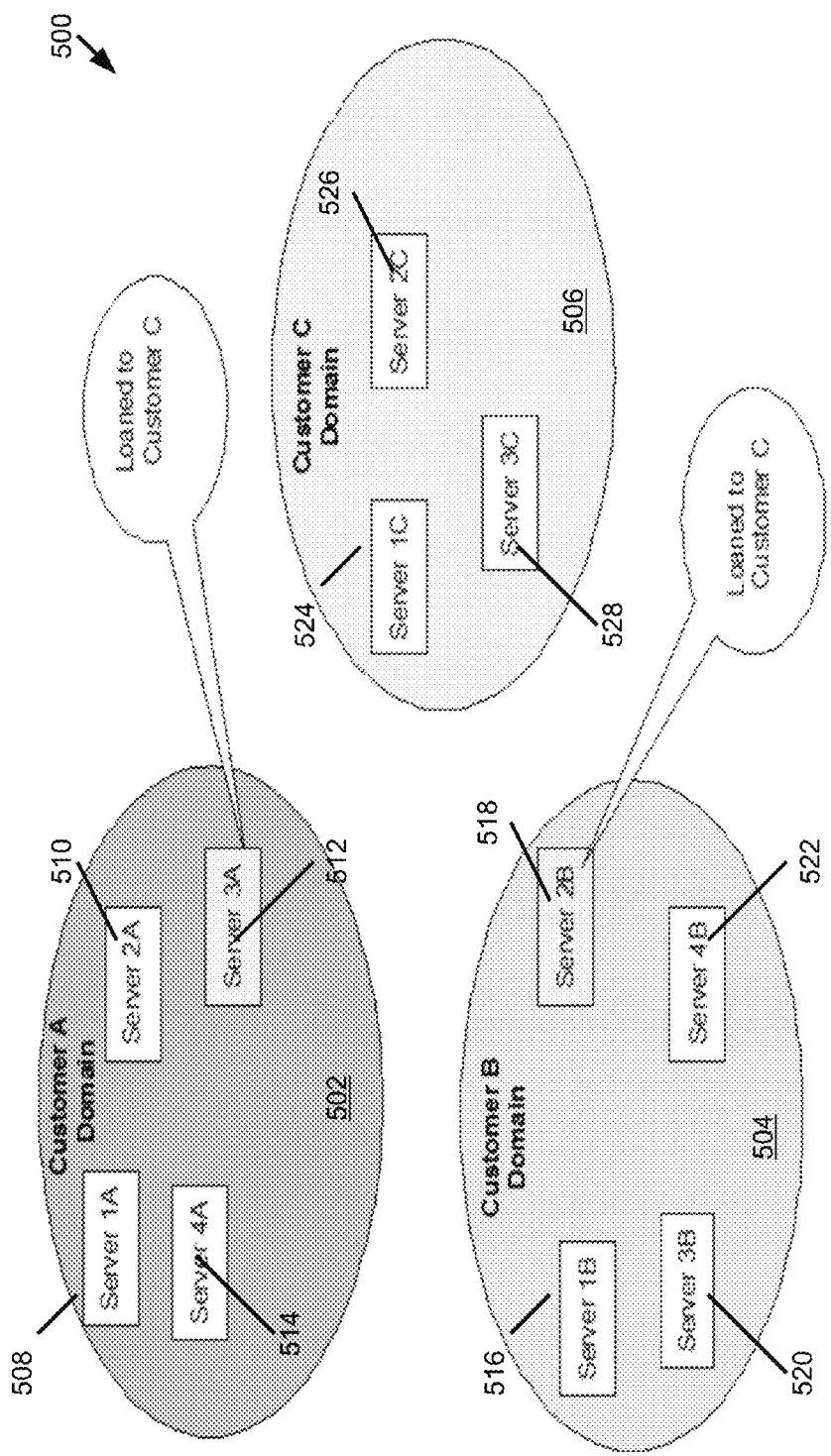
FIG. 12 is a diagrammatic illustration of an example domain level allocation of computing resources of the data processing system of FIG. 1.

FIG. 12 provides an example of computing resource management and sharing across domains at a hypervisor level for an example data processing system 500. As shown in FIG. 12, the data processing system 500 includes three domains: 'Customer A Domain' 502 (referred to as "domain A"), 'Customer B Domain' 504 (referred to as "domain B"), and 'Customer C Domain' 506 (referred to as "domain C"). Domain A includes four hypervisors: 'Server 1A' 508, 'Server 2A' 510, 'Server 3A' 512, and 'Server 4A' 514. Domain B includes four hypervisors: 'Server 1B' 516, 'Server 2B' 518, 'Server 3B' 520, and 'Server 4B' 522. Domain C includes three hypervisors: 'Server 1C' 524, 'Server 2C' 526, and 'Server 3C' 528.

Taking Server 1A 508 as an example, this hypervisor has been allocated to domain A 502, and the primary domain identifier for Server 1A will be 'Customer A'. Moreover, Server 1A 508 has not been temporarily allocated to any other domain, therefore the owning domain identifier for Server 1A will be 'Customer A'. As shown in this example, Server 3A 512 of domain A 502 has been temporarily allocated (i.e., loaned) to domain C 506. Therefore, for Server 3A, the primary domain identifier will be 'Customer A', and the owning domain identifier will be 'Customer C'. Similarly Server 2B 518 of domain B 504 has been temporarily allocated to domain C 506. Hence, for Server 2B, the primary domain identifier will be 'Customer B', and the owning domain identifier will be 'Customer C'.

Figure 13:
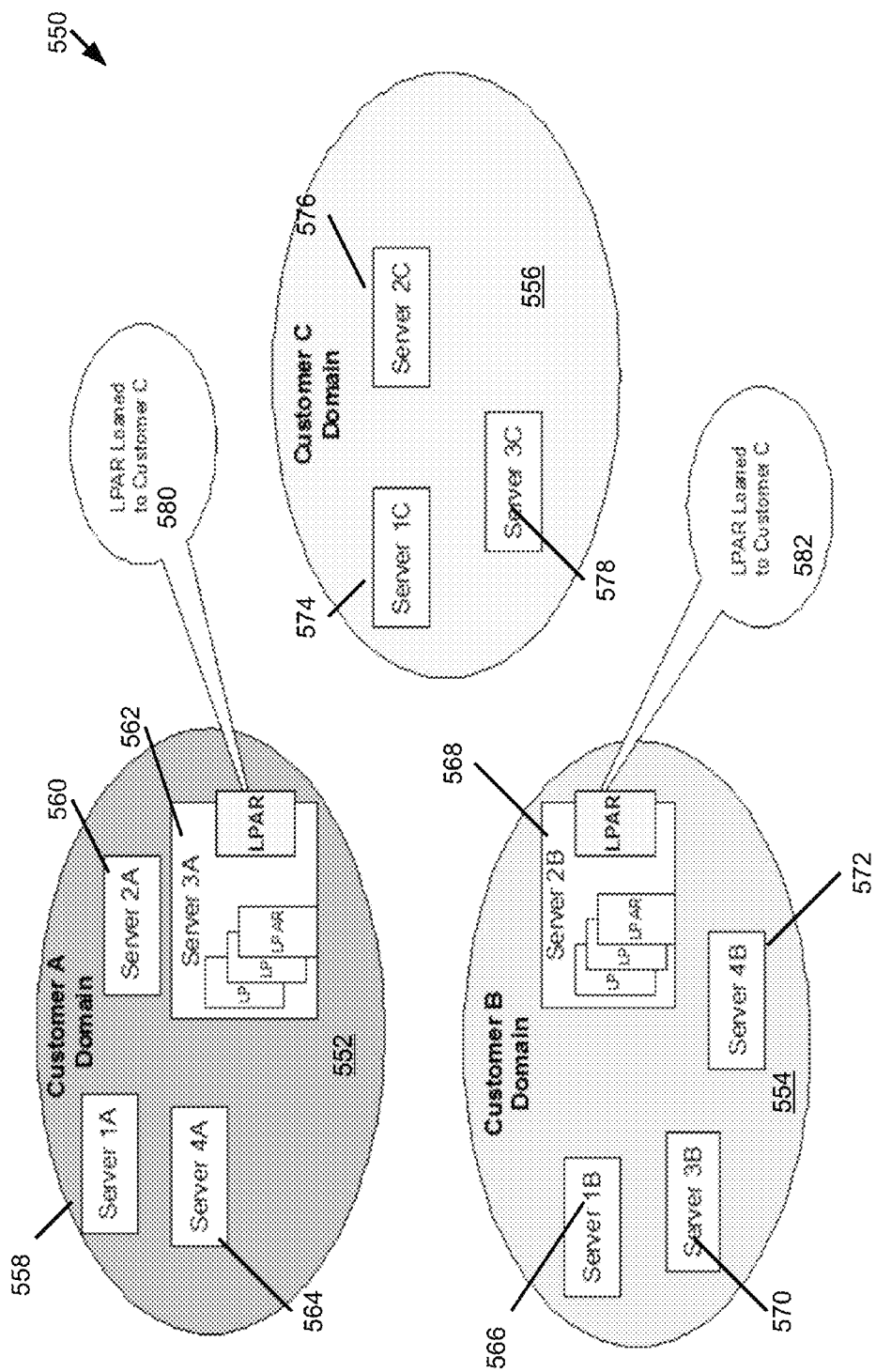
FIG. 13 is a diagrammatic illustration of an example domain level allocation of computing resources of the data processing system of FIG. 1.

Consistent with some embodiments of the invention, a logical partition of computing resources of a first domain may be temporarily allocated to a second domain. As will be appreciated, a logical partition of computing resources may include an associated memory that stores a primary domain identifier and/or an owning domain identifier. FIG. 13 provides an example of computing resource management and sharing across domains at a logical partition level for an example data processing system 550. The example data processing system 550 includes three domains: 'Customer A Domain' 552 (referred to as "domain A"), 'Customer B Domain' 554 (referred to as "domain B"), and 'Customer C Domain' 556 (referred to as "domain C"). Domain A includes four hypervisors: 'Server 1A' 558, 'Server 2A' 560, 'Server 3A' 562, and 'Server 4A' 564. Domain B includes four hypervisors: 'Server 1B' 566, 'Server 2B' 568, 'Server 3B' 570, and 'Server 4B' 572. Domain C includes three hypervisors: 'Server 1C' 574, 'Server 2C' 576, and 'Server 3C' 578.

In this example, Server 3A manages four logical partitions of computing resources, where a first logical partition 580 managed by Server 3A is loaned (i.e., temporarily allocated) to domain C. In this example, the first logical partition would have a primary domain identifier of 'Customer A', and the particular logical partition would have an owning domain identifier of 'Customer C'. In contrast, the other logical partitions managed by Server 3A that are not loaned would have a primary domain identifier of 'Customer A' and an owning domain identifier of 'Customer A'. Similarly, Server 2B manages four logical partitions, where a second logical partition 582 managed by Server 2B is loaned to domain C. Therefore, the primary domain identifier of the second logical partition 582 would be 'Customer B', and the owning domain identifier of the second logical partition 582 would be 'Customer C'.

Consistent with some embodiments of the invention a system management component of the data processing system may be configured to determine computing resource sharing policies of domains, hypervisors, and/or logical partitions thereof upon discovery of the domains, hypervisors, and/or logical partitions in the data processing system. The system management component may store attributes, such as sharing policies, a primary domain identifier, and/or an owning domain identifier for each hypervisor in an inventory database. Generally, such attributes cannot be overridden by clients of the data processing system and may only be configurable at an administrator level. In some embodiments of the invention, domain attributes may be stored in non-volatile RAM of each hypervisor such that one or more system management components may manage common hypervisors and/or servers implementing hypervisors concurrently, and each system management component may be configured to discover hypervisors and/or servers and group them under the same domain identifier.

Furthermore, a domain may comprise one or more servers implementing one or more hypervisors. For each domain, a list of users, clients, administrators, and/or privileges thereof may be maintained for each domain. Consistent with embodiments of the invention, role based access control (RBAC) may be implemented in the data processing system for the management, configuration, and/or utilization of computing resources of domains of the data processing system. Moreover, a super administrator may create domains and lower level system administrators with defined roles/privileges. As will be appreciated, profiles of system administrators may also have domain(s) associated with that profile so that a system administrator may only be able to manage hypervisors and VMs within domains which the system administrator has access to. For example, a user may only be granted read access such that the user may only view the attributes of the system. In this example, the user may not set/change attributes, policies, and/or configurations of the data processing system. As another example, a user may be granted write access such that the user may modify some attributes of the data processing system. In this example, the user may set/change one or more attributes for the data processing system.

Consistent with embodiments of the invention, a domain identifier may be a hexadecimal number generated by a pseudo-random number generator, or a domain identifier may be a readable string of text characters. A system management component of the data processing system manages computing resources allocation to each domain, temporary allocation of computing resources to domains, system level computing resource policies, domain level computing resource policies, hypervisor level computing resource policies, and/or client related computing resource policies. Furthermore, the system management component may manage profiles of users that define access rights, domain affiliations, user specific settings, and/or other such information.

Generally, a system management component, and an interface/console generated thereby may support commands for setting domain attributes (e.g., primary domain identifier, owning domain identifier). Furthermore, the system management component may be configured to perform operations to loan computing resources and/or a hypervisor to a different domain. The system management component may be configured to enforce time limits, where a time limit may include a specific start time and end time for a loan period.

In general, the system management component may be configured to enforce policies. Hence, temporary allocations of computing resources and/or hypervisors are reported to the system management component. While the system management component may be described as a single component, the invention is not so limited. Consistent with some embodiments of the invention, a policy management module may be independently configured for the data processing system, each server, each domain, one or more hypervisors, etc. In such embodiments, the system management component may automatically identify one or more policy management modules of the data processing system by querying a communication network of the data processing system.

As an example, a directory agent/service agent may be configured to monitor the communication network of the data processing system. When a policy management module starts up, an associated communication address may be registered with the directory/service agent, and the system management component may be configured to identify the policy management module from the directory/service agent. Moreover, each system management component of a data processing system may send a multicast query to discover policy management modules of the data processing system.

The system management component may comprise a policy enforcement component configured to enforce any policies maintained by the system management component and/or a policy management module. Generally, the policy enforcement component is configured to monitor time limits for loans of computing resources. In response to expiration of a time limit, the policy enforcement component is configured to reset an owning domain identifier for a corresponding temporarily allocated hypervisor and/or corresponding temporarily allocated computing resources.

FIG. 14 provides a table 600 that illustrates example computing resource loan information for the data processing system of FIG. 12. As discussed above, with respect to FIG. 12, Server 3A is temporarily allocated from the Customer A domain to the Customer C domain. In this example, the time limit for the loan of Server 3A is defined as having a start time of 1:00 AM and an end time of 6:00 PM. Similarly, Server 2B is temporarily allocated from the Customer B domain to the Customer C domain. In this example, the time limit for the loan of Server 2B is defined as having a start time of 2:00 PM and an end time of 11:00 PM.

Consistent with some embodiments of the invention, a first domain that has loaned computing resources to a second domain may dynamically extend the time limit. In such embodiments, the first domain may communicate a time extension to the second domain and the system management component (e.g., the policy management module and/or the policy enforcement component). Furthermore, if a time limit is about to expire for a computing resource loan from a first domain to a second domain, the second domain may be given preference to borrow the same computing resources again as compared to a third domain in need of the computing resources. Such configuration may increase efficiency by reducing configuration and setup times moving computing resources to a different borrowing domain.

Embodiments of the invention generally provide secure data processing improvements for data processing systems configured for use by more than one client. Consistent with embodiments of the invention, the communications exchanged between domains, hypervisors, etc. may be encrypted (e.g., symmetric/asymmetric key exchange) to prevent "man in the middle" attacks. Furthermore, if a hypervisor is loaned from a first domain to a second domain, access privileges for users will be determined based on the owning domain identifier, such that users of the first domain may not be able to access the hypervisor or managed resources for the period of the loan. The policy enforcement component may be configured to analyze user actions/requests and enforce access policies based at least in part on the owning domain identifier of a hypervisor/computing resources identified in an action/request.

Furthermore, embodiments of the invention limit creation of virtual machines only to domains for which the requesting user has is permitted to access. The policy enforcement module may analyze a domain identifier of a user and the domain attributes of a hypervisor that the user is attempting to access. The policy enforcement component may be configured to analyze a user access permission level to control virtual machine creation on domain resources. In addition, embodiments of the invention may limit virtual machine migration based on domain attributes of an originating hypervisor, domain attributes of a target hypervisor, and/or a domain of a user associated with the migration. As will be appreciated, if a hypervisor is loaned from a first domain to a second domain, then the primary domain identifier and the owning domain identifier will differ. In such situation, a user access privilege check may be based on the owning domain identifier. When a virtual machine needs to be migrated from a first hypervisor to a second hypervisor, the migration is only allowed if the first hypervisor and second hypervisor are in the same domain. As will be appreciated, if the second hypervisor is loaned to the domain of the first hypervisor, then the migration would be allowed. Hence, the virtual machine migration will be allowed/denied by the policy enforcement component by checking policies and loans through the policy management module.

Therefore, embodiments of the invention may address shortcomings in data processing technology by performing dynamic platform optimization for data processing systems. In particular, embodiments of the invention may restore processor-memory affinity for allocated processor and memory resources of logically-partitioned data processing systems, thereby increasing efficiency and performance of such data processing systems. Furthermore, embodiments of the invention address shortcomings of conventional systems that may become sub-optimally configured over time. Embodiments of the invention perform dynamic platform optimization of a data processing system automatically and responsive to system resource changes by reallocating processor and memory resources of logical partitions.

While the present invention has been illustrated by a description of various embodiments and while these embodiments have been described in considerable detail, it is not the intention of the applicants to restrict, or in any way limit, the scope of the appended claims to such detail. For instance, another embodiment consistent with the invention supports migration between logical partitions on the same computer. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A data processing system comprising:
a plurality of processing nodes on a plurality of servers;
a pool including a plurality of logically partitioned computing resources distributed among the plurality of processing nodes on the plurality of servers, the plurality of logically partitioned computing resources including a plurality of processors and a plurality of memory resources;
a plurality of hypervisors executing on the plurality of servers that each manage one or more logical partitions;
a memory that stores program code configured to be executed by at least one processor to cause the at least one processor to:
allocate each hypervisor and logical partition managed thereby to a domain among the plurality of domains, including allocate to at least one of the plurality of domains a plurality of hypervisors, wherein allocating the plurality of the hypervisors to the plurality of domains allocates each logical partition that is managed by each hypervisor and isolates each logical partition managed by each hypervisor from those managed by hypervisors allocated to other domains;
receive, at a first domain of the plurality of domains and from a second domain of the plurality of domains, a token that identifies an amount and type of available computing resources of the second domain that are available for temporary allocation;
determine whether the available computing resources of the second domain are needed by the first domain based at least in part on the received token; and
in response to determining that the available computing resources are needed by the first domain, temporarily allocate the available computing resources to the first domain for use thereby.

2. The data processing system of claim 1, wherein the program code is further configured to:
at the first domain, process the token to update a computing resource map associated with the first domain based on the token to indicate the amount and type of computing resources of the second domain that are available for temporary allocation.

3. The data processing system of claim 1, wherein the program code is further configured to:
select a management hypervisor for the second domain from the one or more hypervisors allocated to the second domain based at least in part on availability of the logical partitions managed by the one or more hypervisors;
analyze, with the management hypervisor, computing resource availability for the one or more hypervisors and the logical partitions allocated to the second domain; and
generate, with the management hypervisor, the token based at least in part on the determined computing resource availability.

4. The data processing system of claim 1, wherein the data processing system includes, for each hypervisor of the plurality of hypervisors, an associated memory that stores a primary domain identifier and an owning domain identifier, the available computing resources temporarily allocated to the first domain includes a particular hypervisor, and the program code is further configured to:
in response to temporarily allocating the available computing resources to the first domain, set the owning domain identifier of the particular hypervisor to identify the first domain.

5. A computer program product, comprising:
a non-transitory computer readable medium; and
program code stored on the computer readable medium and configured to be executed by at least one processor to cause the at least one processor to:
for a data processing system configured with a plurality of processing nodes on a plurality of servers and a pool including a plurality of logically partitioned computing resources distributed among the plurality of processing nodes on the plurality of servers and a plurality of hypervisors executing on the plurality of servers that each manage one or more logical partitions, allocate each hypervisor and logical partition managed thereby to a domain among the plurality of domains, including allocate to at least one of the plurality of domains a plurality of hypervisors, wherein allocating the plurality of the hypervisors to the plurality of domains allocates each logical partition that is managed by each hypervisor and isolates each logical partition managed by each hypervisor from those managed by hypervisors allocated to other domains;
receive, at a first domain of the plurality of domains and from a second domain of the plurality of domains, a token that identifies an amount and type of available computing resources of the second domain that are available for temporary allocation;

determine whether the available computing resources of the second domain are needed by the first domain based at least in part on the received token; and in response to determining that the available computing resources are needed by the first domain, temporarily allocate the available computing resources to the first domain for use thereby.

6. The computer program product of claim 5, wherein the program code is further configured to:

at the first domain, process the token to update a computing resource map associated with the first domain based on the token to indicate the amount and type of computing resources of the second domain that are available for temporary allocation.

7. The computer program product of claim 5, wherein the program code is further configured to:

select a management hypervisor for the second domain from the one or more hypervisors allocated to the second domain based at least in part on availability of the logical partitions managed by the one or more hypervisors;

analyze, with the management hypervisor, computing resource availability for the one or more hypervisors and the logical partitions allocated to the second domain; and generate, with the management hypervisor, the token based at least in part on the determined computing resource availability.

8. The computer program product of claim 5, wherein the data processing system includes, for each hypervisor of the plurality of hypervisors, an associated memory that stores a primary domain identifier and an owning domain identifier, the available computing resources temporarily allocated to the first domain includes a particular hypervisor, and the program code is further configured to:

in response to temporarily allocating the available computing resources to the first domain, set the owning domain identifier of the particular hypervisor to identify the first domain.

\* \* \* \* \*